Sept. 10, 1968   K. H. HELLER ET AL   3,400,967
GRIPPER FOR HOISTING EQUIPMENT
Filed May 24, 1967                    2 Sheets-Sheet 1
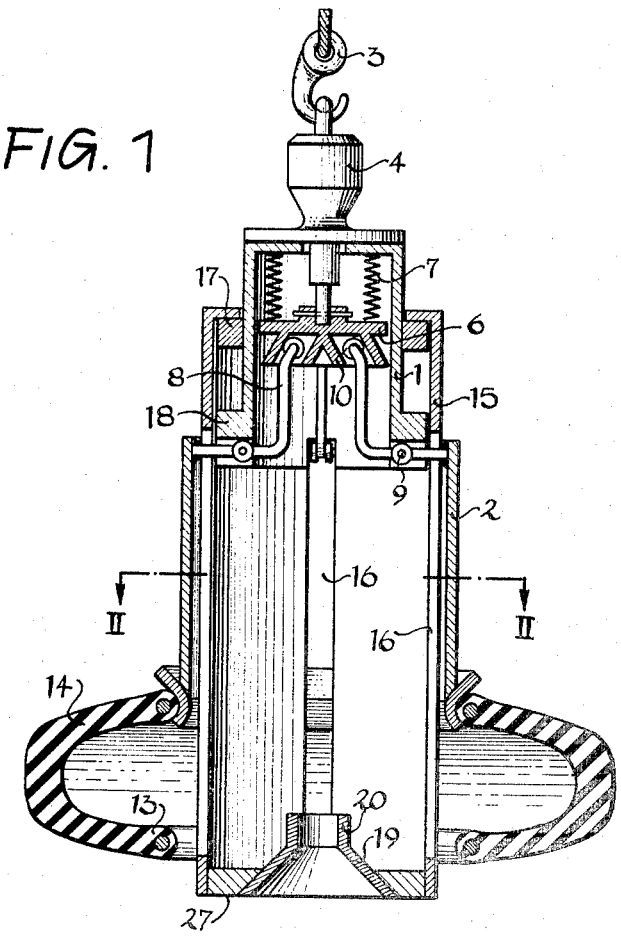
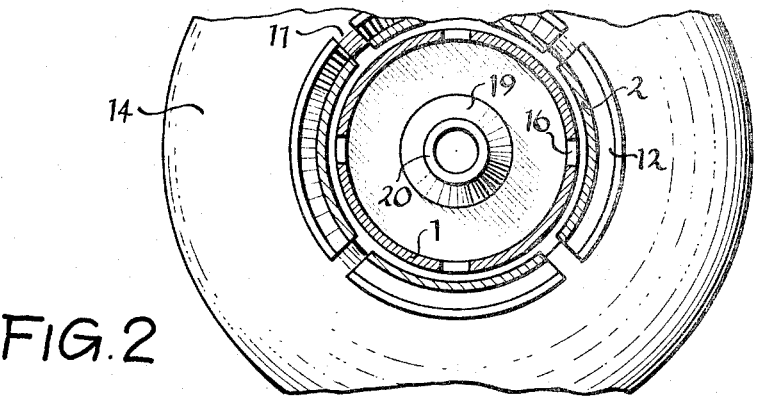
INVENTORS:
Karl Heinz Heller
Georg Pietzuch
Günther Heidelmann

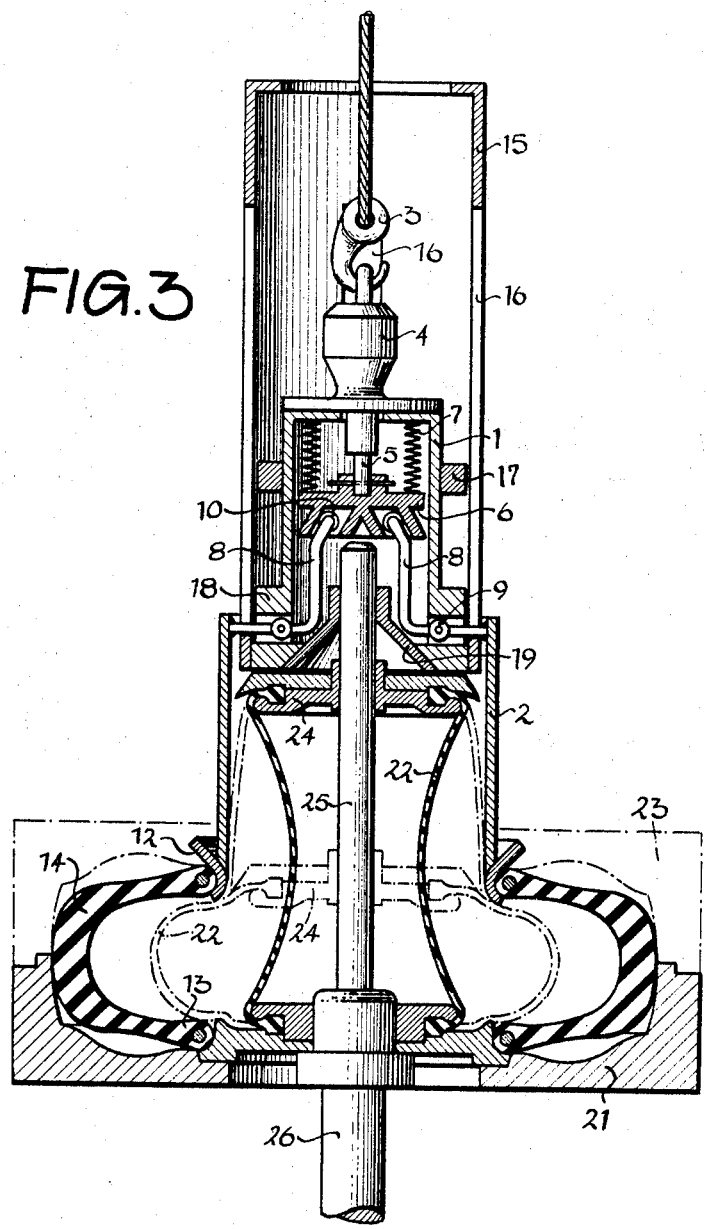

United States Patent Office 3,400,967
Patented Sept. 10, 1968

3,400,967
GRIPPER FOR HOISTING EQUIPMENT
Karl Heinz Heller, Georg Pietzuch, and Gunther Heidelmann, Hannover, Germany, assignors to Continental Gummi-Werke AG., Hannover, Germany
Filed May 24, 1967, Ser. No. 640,911
Claims priority, application Germany, May 26, 1966, C 39,169; Sept. 17, 1966, C 40,128
6 Claims. (Cl. 294—93)

ABSTRACT OF THE DISCLOSURE

The gripper is designed for grasping raw tires and finished tires, by means of circularly arranged gripping fingers to grasp the inner margin of a tire lying on one of its sidewalls, and is characterized primarily in that in the space defined by the gripping fingers there is axially, vertically, displaceably arranged a centering funnel open toward the bottom thereof, said funnel being adapted to be displaced at least within the range of the height of the tire to be grasped for cenering the gripping fingers relative to said tire.

---

The present invention concerns a gripper for hoisting equipment for grasping rubber tires or raw tires, which gripper is adapted by means of circularly arranged spreadable gripping fingers to grasp the upper inner rim of a tire in lying condition.

It is an object of the present invention to provide a gripper of the above mentioned general type which will make it possible to move the raw tires in precise alignment into a vulcanizing mold.

It is another object of this invention to provide a gripper as set forth in the preceding paragraph which will be able to grasp the finished tire in proper alignment.

It is still another object of this invention to provide a gripper of the above mentioned type with a device which will align and guide the gripper and will also be adapted if desired automatically to move out of the range of the gripping fingers.

It is a still further object of this invention so to design the gripper that it can be easily attached to the device.

These and other objects and advantages of the invention will appear more clearly from the following specification in connection with the accompanying drawings, in which:

FIG. 1 diagrammatically illustrates a vertical longitudinal section through a gripper according to the invention with a raw tire suspended thereon.

FIG. 2 represents a section along the line II—II of FIG. 1.

FIG. 3 illustrates a gripper according to FIG. 1 after the latter has lowered a raw tire into a vulcanizing mold.

The gripper acording to the present invention, which is designed for grasping rubber tires or raw tires and which is adapted by means of circularly aranged gripping fingers which can be spread apart to grasp the inner margin of a lying tire, is characterized primarily in that in the space defined by the gripping fingers there is axially vertically displaceably arranged a centering funnel open toward the bottom which funnel is adapted to be displaced at least within the range of the height of the grasped tire or raw tire.

The thus designed gripped has as lowermost confinement relative to the gripper with the grasped finished tire or raw tire a centering funnel which when relieving the grasped tire or prior to grasping the same is first placed onto the vulcansing mold or the depositing area and by means of a mandrel, a bar, or the like, moved into its central position. When further lowering the gripper, the centering funnel will in view of its displaceability in rest position and between the gripping fingers move relatively upwardly so that it is moved completely out of the working range of the gripping fingers.

Similarly, when grasping for instance a finished vulcanized tire, the centering funnel will first align the gripper and finally prior to the grasping of the tire will be moved out of the working range of the gripping fingers.

A particularly advantageous construction consists in connecting the centering funnel to the lower end of an axially displaceable sleeve which is slidably surrounded by the gripping fingers. The sleeve with the centering funnel fills the entire inner space of the gripping fingers and when lowering the gripper following the alignment operation is displaced relatively upwardly so that the entire inner space of the gripping fingers is again freed.

According to a further development of the present invention, the gripper is in its shape adapted to the centering device in such a way that the sleeve is surrounded by the gripping fingers which together form a cylinder mantle. The displaceable sleeve with the centering funnel as well as the gripping fingers will with this construction of the gripper form preferably cylindrical sleeves which are suitable for a mutual guiding while the gripping fingers which form an almost closed mantle can easily be moved into the inner space of a tire and can likewise easily be slipped over the heating hose in the interior of the tire in the vulcanizing mold.

A further advantageous construction of the gripper according to the present invention for receiving the centering device consists in that the sleeve carrying the centering funnel is in axial direction provided with a number of slots equalling the number of gripping fingers, said slots being adapted to guide two-arm levers for actuating the gripping fingers. The movement of the gripping fingers is controlled through the slots of the sleeve, the actuating device for the gripping fingers being arranged within the displaceable sleeve. With this design of the gripper, the sleeve may be displaced in upward direction as far as the space for the gripper permits. The height of the device for actuating the gripping fingers is not unnecessarily enlarged by the displaceable sleeve. Therefore, the particular feature of the device according to the present invention consists in that the sleeve in its upper position surrounds the devices required for the actuation of the gripping fingers and has its lower end located close to the pivot point for the two-arm levers.

Referring now to the drawings in detail, the gripper illustrated therein comprises primarily a housing 1 from which the gripping fingers 2 are controlled. As will be evident from FIGS. 1 and 3, the gripper is suspended on a hook 3 of a hoist. For purposes of actuating the gripping fingers 2 there is provided an electromagnet 4 the lifting bar 5 of which (FIG. 3) is linked to the control head 6. By actuation of the electromagnet 4, the control head 6 is moved upwardly whereby the springs 7 are compressed. When the current flow in magnet 4 is interrupted, the control head 6 moves downwardly partially by its own weight and partially by the thrust of springs 7. In view of the movement of the control head 6, the two-arm levers 8 are pivoted about the pivots 9 so that the gripping fingers 2 either spread apart or pull together.

The ends of the lever 8 are provided with rollers 10 which are located in a conical recess in the control head 6. The levers 8 are journalled at the lower end of housing 1, and according to a specific embodiment shown in the drawing, there are provided four levers 8. However, it should be noted that if desired also six, eight or more levers 8 and a corresponding number of gripping fingers 2 can be provided.

The other ends of levers 8 have welded or riveted thereto the gripping fingers 2 which, as is particularly clearly shown in FIG. 2, together form a cylindrical mantle. Between the gripping fingers 2 there are provided spaces 11 required for the movement of said gripping fingers. The free ends of the gripping fingers 2 have connected thereto grooved members 12 the cross section of which substantially corresponds to the cross sectional shape of the beads 13 of the tire 14. The upper legs of the grooved members 12 flare so that when introducing the grooved members 12 into the tire 14 a centering effect will be obtained.

The gripper is furthermore equipped with a sleeve 15 which in its longitudinal direction is provided with four slots 16 in which the outer ends of the levers 8 are slidably received. Sleeve 15 is adapted to move in upward or downward direction relative to the housing 1 of the gripper in which instance the sleeve 15 is guided primarily by rings 17 and 18. A centering funnel 19 is arranged at the lower end of the sleeve 15, the upper end of said funnel 19 merging with a cylindrical portion 20.

FIG. 1 shows the gripper suspended on a hook 3 while the gripper has grasped a finished or raw tire. In this position, the sleeve moves downwardly until it rests on ring 17 and with its lower end, i.e. with the centering funnel 19, protrudes in downward direction from the tire 14. The gripper will in this position be placed on a vulcanizing mold 21 diagrammatically shown in FIG. 3, the central portion of which carries a heating hose 22. Prior to closing the vulcanizing mold 21 by means of a cover 23 shown in dot-dash lines, a clamping plate 24 holding the upper end of the heating hose 22 is lowered until it has reached the position shown in dot-dash lines. The heating hose is by means of air or steam pressure pressed into the hollow chamber of the tire 14 and during the vulcanization occupies the position likewise shown in dot-dash lines.

When the gripper is placed upon the open vulcanizing mold in FIG. 3, the funnel 19 first reaches the clamping plate 24 which for the vertical movement is arranged on the upwardly and downwardly movable rod 25. The centering funnel 19 is slipped upon said rod 25 whereby the gripper will be precisely aligned with regard to the mold 21. During the further lowering operation, the sleeve 15 will be at a standstill on the clamping plate 24, whereas the gripping fingers 2 move to their lowermost position. The sleeve 15 then moves out the range of the gripping fingers 2, and by actuation of the electromagnet 4, the grooved members 12 are moved inwardly, relieve the tire 14 and can then be moved out of the mold for a new working cycle.

When lifting the tire 14 out of the mold, the above described operation is repeated but in the reverse order. The electromagnet 4 is actuated only when grasping and relieving a tire, whereas otherwise the gripping fingers 2 are held in their gripping position by means of the springs 7.

Depending on the construction of the vulcanizing mold which has been referred to merely for purposes of explanation of the operation of the gripper according to the present invention, the rod 25 may be actuated by hydraulically or pneumatically operable cylinder piston means 26. The sleeve 15 should in its lowermost position, i.e. with suspended gripper, be flush with at least the lower surface of the tire 14 so that the funnel 19 when being lowered onto a mold will contact the clamping plate 24 and the rod 25. When the gripper has been deposited in conformity with FIG. 3, the sleeve 15 should have been moved upwardly as completely as possible out of the range of the gripping fingers 2.

In order to make sure that the gripper is always vertical and is not deposited on an incline, the annular plate 27 is magnetic. As a result thereof, the alignment of the gripper into its required vertical position which otherwise is effected by gravity only will be considerably aided. Also the maintenance of the obtained vertical position of the gripper with regard to the mold is by the magnetized annular plate 27 greatly increased against the effect of accidentally occurring tilting forces.

It is, of course, to be understood that the present invention is, by no means, limited to the particular construction shown in the drawings but also comprises any modifications within the scope of the appended claims.

What we claim is:

1. A gripper adapted to be suspended on a hoist for selectively grasping and releasing the inner rim of a tire resting on one of its side walls, which includes: a plurality of gripping fingers arranged along a circle and together with each other defining the contour of a cylinder, power operable means operatively connected to said gripping fingers for selectively moving the same into tire rim grasping position and tire rim releasing position, a centering funnel opening in downward direction and substantially coaxial with said gripping fingers, said centering funnel being movable within the confines of said gripping fingers, and movable supporting means supporting said funnel and operable to axially move said funnel into a tire to be handled over a stroke at least equalling the height of a tire to be handled by said gripper.

2. A gripper according to claim 1, in which said supporting means includes a sleeve substantially coaxial with said funnel and having said funnel connected to the lower end of said sleeve, and guiding means slidably guiding said sleeve for vertical movement thereof from a first position to a second position and vice versa.

3. A gripper according to claim 2, in which said gripping fingers include cylindrical wall sections having their vertical edges spaced from each other in said tire rim grasping position of said gripping fingers, said cylindrical wall sections surrounding said sleeve.

4. A gripper according to claim 2, in which said sleeve is provided with a plurality of slots corresponding in number to the number of gripping fingers and extending in the axial direction of said sleeve, and pivotable lever means extending through said slots and operatively connected on one hand to said gripping fingers for actuating the same and on the other hand to said power operable means.

5. A gripper according to claim 4, in which the upper end portion of said sleeve in the first position of the latter surrounds said power operable means and in which the lower end of said sleeve in the second position of the latter is located near the pivot axes of said pivotable lever means.

6. A gripper according to claim 1, in which said funnel has its lower end portion provided with magnetic surface means.

References Cited

UNITED STATES PATENTS 2,997,738  8/1961  Soderquist _____ 294—93 X

RICHARD E. AEGERTER, *Primary Examiner.*

R. D. GUIOD, *Assistant Examiner.*